July 10, 1934. T. M. LEKA 1,966,300
AIRCRAFT
Filed June 28, 1932 3 Sheets-Sheet 1
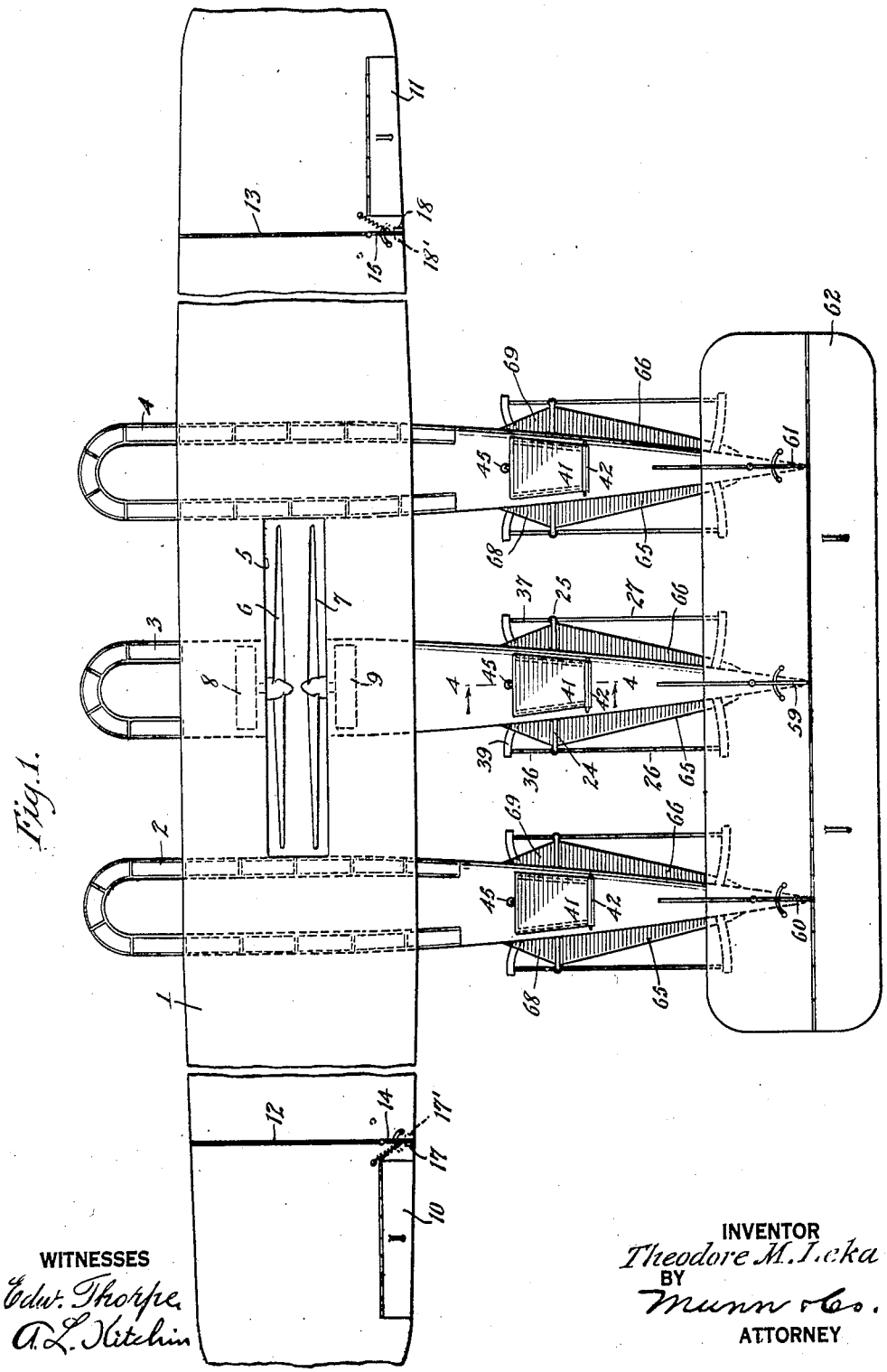
WITNESSES
Edw. Thorpe
A. L. Kitchin
INVENTOR
Theodore M. Leka
BY
Munn & Co.
ATTORNEY July 10, 1934.  T. M. LEKA  1,966,300
AIRCRAFT
Filed June 28, 1932   3 Sheets-Sheet 2
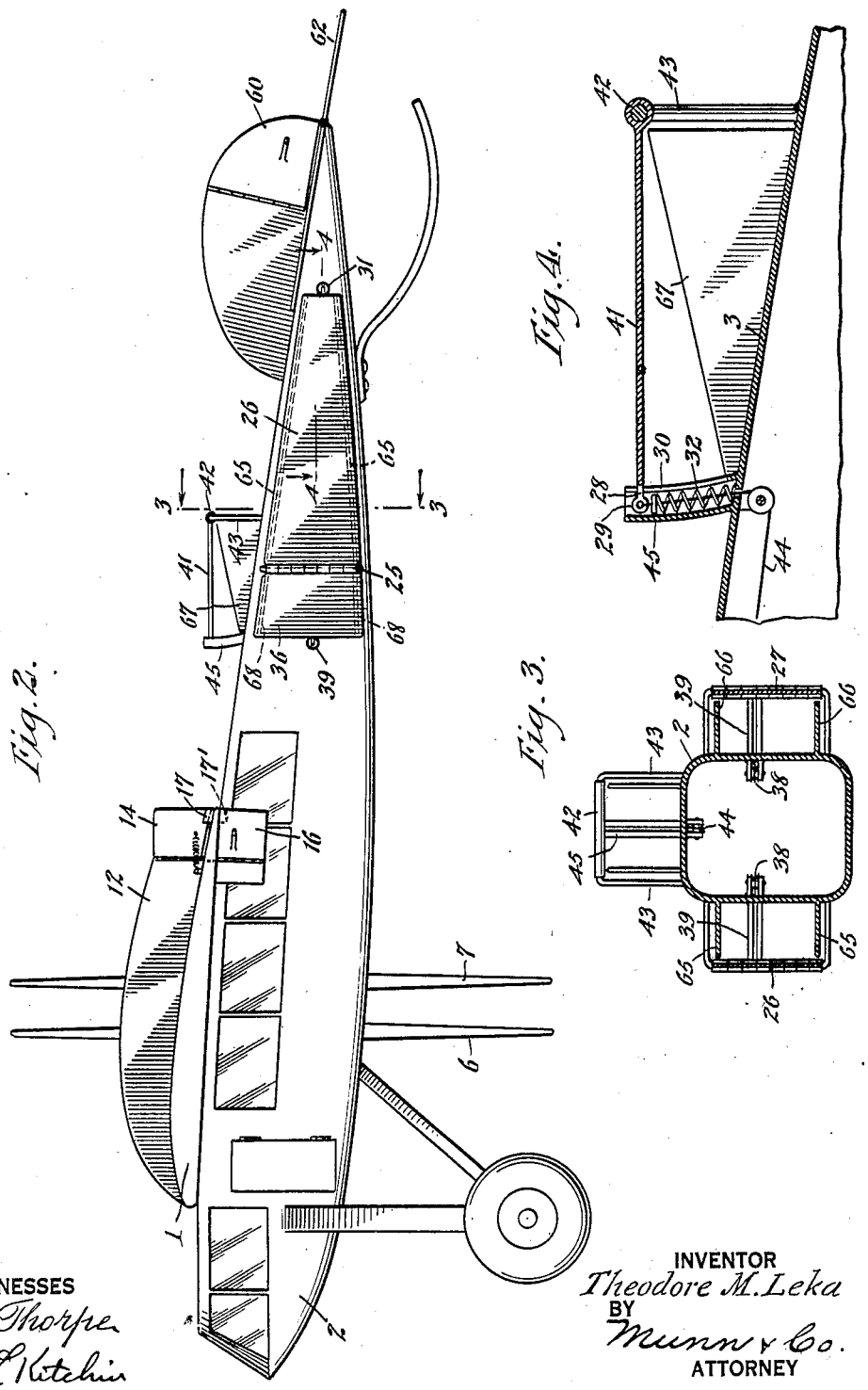
INVENTOR
Theodore M. Leka
BY
Munn & Co.
ATTORNEY
WITNESSES
Edw. Thorpe
A. L. Kitchin July 10, 1934.　　　T. M. LEKA　　　1,966,300
AIRCRAFT
Filed June 28, 1932　　3 Sheets-Sheet 3
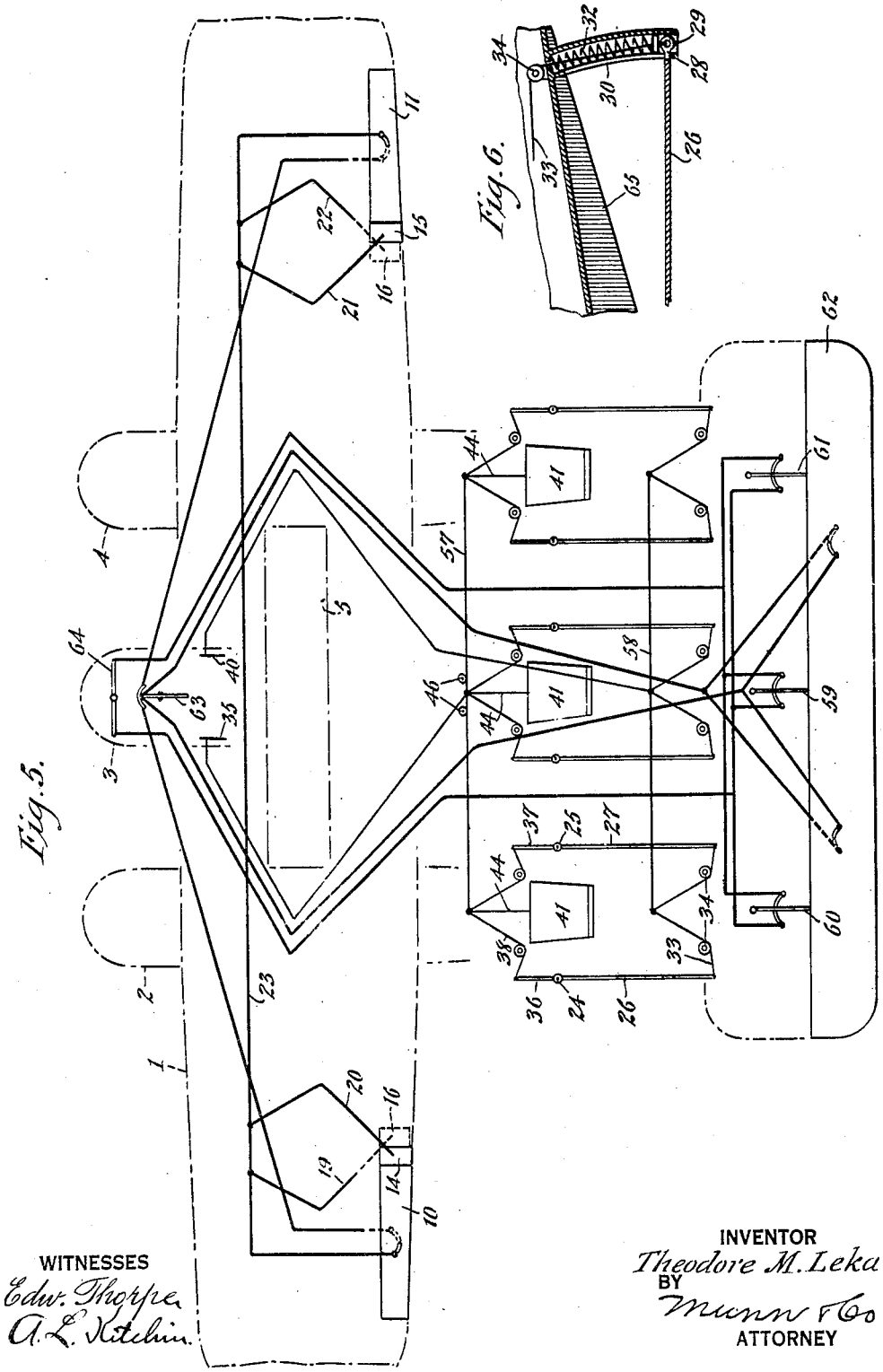
INVENTOR
Theodore M. Leka
BY
Munn & Co.
ATTORNEY
WITNESSES
Edw. Thorpe
A. L. Kitchin Patented July 10, 1934

1,966,300

UNITED STATES PATENT OFFICE 1,966,300

AIRCRAFT

Theodore M. Leka, New York, N. Y.

Application June 28, 1932, Serial No. 619,761

4 Claims. (Cl. 244—29)

This invention relates to airships or aircrafts and has for an object to provide an improved construction utilizing one or more fuselages and with the parts so constructed that the propeller or propellers are set back from the leading edge of the aerofoil.

Another object of the invention is to provide an airplane wherein the aerofoil is provided with an opening substantially midway between the leading and following edge with one or more engines arranged to drive a propeller located in the opening.

Another object is to provide in an aircraft of the airplane type a wing structure having one or more fins extending transversely of the wing structure near the respective ailerons, the same being associated with the top and bottom wing rudders connected to the aileron controls so as to function therewith.

A further object of the invention is to provide in an aircraft of the airplane type brake mechanisms for retarding the forward movement of the aircraft and auxiliary brake mechanisms for retarding any rearward movement.

In the accompanying drawings,—

Figure 1 is a top plan view of an aircraft disclosing one of the embodiments of the invention.

Figure 2 is a side view of the aircraft shown in Figure 1.

Figure 3 is a sectional view through Figure 2 on line 3—3.

Figure 4 is an enlarged fragmentary sectional view through Figure 1 on line 4—4.

Figure 5 is a diagram of the various controls for the ailerons, rudders and brakes.

Figure 6 is a detail fragmentary sectional view through Figure 2 on line 6—6.

Referring to the accompanying drawings by numerals, 1 indicates the aerofoil which is adapted to extend across three fuselages or bodies 2, 3 and 4. While three fuselages have been shown in the accompanying drawings, it will be evident that the invention may be applied to aircrafts having more fuselages or less, as, for instance, one or two.

The aerofoil 1 is provided with an opening or well 5 which also extends through the central body 3. Where a single fuselage is used two wells could be used, one on each side of the fuselage.

As shown in Figure 1 of the drawings, propellers 6 and 7 are positioned to operate in the opening 5 and be actuated by suitable engines 8 and 9 carried in the body 3. It will be seen that as the parts are positioned one of the propellers will act as a pusher and the other will pull.

The detail structure of the respective bodies may be varied widely, and, consequently, may be of any desired construction so as to have suitable space for freight and passengers, as well as for the crew. Also, the aerofoil 1 is provided with any desired form of ailerons 10 and 11 and with fore and aft top fins 12 and 13 arranged adjacent the respective ailerons 10 and 11. The fins 12 and 13 fall short of the trailing edge of the aerofoil 1. Wing rudders 14 and 15 are connected to the rear end of the fins and these rudders extend to the trailing edge of the aerofoil. On the under surface of the aerofoil there is provided a lower wing rudder 16 adjacent each aileron and directly beneath the respective rudders 14 and 15. All of the rudders just described are adapted to swing back and forth in horizontal planes when the aircraft is moving in a horizontal direction.

The ailerons 10 and 11 are provided with the usual controls including the control wires, and the rudders 14 to 16 inclusive are connected to these controls so that the respective rudders will function with the respective ailerons. For instance, when the aircraft is turning to the left and is going into a bank, the top rudder 14 will remain stationary and the bottom rudder 16 adjacent aileron 11 will remain stationary but the bottom rudder 16 adjacent aileron 10 will turn and the top rudder 15 will turn to assist in balancing the machine and giving a steadying action thereto.

In Figure 1 it will be seen that stationary and fixed abutments 17 and 18 will prevent the rudders 14 and 15 from turning except in one direction while similar stops 17' and 18' will permit the lower wing rudders to swing only in one direction.

As shown in Figure 5 the respective rudders are connected by cables or wires 19, 20, 21 and 22 to the control wire 23 which is the usual control wire connected to the respective ailerons 10 and 11. When the aircraft banks and makes a turn to the left, the top rudder at the left remains stationary but the bottom rudder turns to the left and at the same time adjacent the right aileron a top rudder turns to the left and the bottom rudder remains stationary. It is to be understood that during this banking operation the ailerons 10 and 11 act in the usual manner. In turning and banking to the right the top rudder at the left turns to the right and the bottom rudder remains stationary, while adjacent the right aileron 11, the top rudder remains stationary and the bottom rudder turns to the right. This permits an easier and quicker turning movement of the aircraft and also permits more accurate steering during the turning operation.

When the airship is traveling, for instance, in a horizontal direction and it is desired to check the speed for landing or some other purpose, the engine may be slowed down in the usual way, and in addition, the improved brake mechanism, shown in Figures 1, 3 and 4, is used.

If desired, the engine could be left running at full speed and the improved brake mechanism used to slow down the aircraft, which would be the usual course where the slowing down of the aircraft is for some other purpose than landing, as, for instance, for observation. As shown in the drawings, there are three brake mechanisms connected together and all function at the same time. Where there is only one body or fuselage there will naturally only be one set of brake mechanisms. As all three brake mechanisms are of identical structure, the description of one will apply to all.

The various brake mechanisms are arranged at the rear of the body and are carried by brackets 24 and 25 which are rigidly secured to the fuselage 3. The swinging brake planes 26 and 27 are pivotally connected with the brackets 24 and 25 respectively. Each brake plane is provided with an extension 28 having an eye 29, said extension projecting through the slit 30 in the guide 31 rigidly connected with the fuselage 3. A spring 32 acts on the fuselage and on the eye 29 to normally hold the brake plane outwardly or in a position fore and aft of the direction of flight of the aircraft. A cable 33 is connected with the eye 29 and extends through the spring 32 and around the guiding pulley 34. From the guiding pulley 34, the cable extends in a suitable manner to cables of the other brake members, and thence to the control lever 35, as shown in Figure 5, whereby the aviator may actuate the cable at any time.

As shown in Figure 4, the spring 32 normally maintains the brake plane 41 in a fore and aft position, which is an inoperative position, but when the cable 44 is pulled and spring 32 is compressed, the rearward end of the plane 41 will swing inwardly to a position near the fuselage 3, whereupon the air striking the same will produce a retarding effect on the aircraft.

The description has been given in regard to the brake plane 27, but it will be understood that an identical structure is used in connection with the brake plane 26, and, therefore, the description will apply thereto. The planes 26 and 27 operate in unison and as heretofore set forth this brake structure acts in unison with the other brake structures illustrated in Figure 1 and in the diagram in Figure 5.

In addition to the brake structure for checking the forward speed of the aircraft a reverse brake structure has been provided for checking the reverse movement of the aircraft. Occasionally, when gaining elevation or in some other maneuver, the engine stalls, or for some other reason the aircraft may slide rearwardly and downwardly. To check this action a rear brake structure has been provided which acts very similar to the brake structure just described but in a reverse direction. As illustrated in Figures 1 and 5, rear brake planes 36 and 37 are hingedly connected with the brackets 24 and 25 and are actuated by the various cables 38 which extend through guides 39 and are connected to the various planes 36 and 37 in an identical way, as illustrated in Figure 4, but when the cables are pulled by reason of the actuated lever 40 shown in Figure 5, the forward end of the rear brake planes 36 and 37 are swung inwardly toward the fuselage, and thereby check a rearward movement of the aircraft.

In addition to this construction a top rear brake 41 is provided, the same being hingedly mounted at 42 on bracket 43 and actuated by cable 44 through a guide and associated mechanism 45, which is identical with the guide 31 except that it is mounted on top of the fuselage and the forward movement of the plane 41 is downward when moving to a braking position. Normally, this plane is extending fore and aft of the fuselage in a similar way to the other brake planes. It is, of course, understood that these various brake planes will not completely stop the movement of the aircraft, either in a reverse or a forward direction but will check the speed and give the aviator an opportunity to maneuver the ship in some desired way.

As shown in Figure 5, which diagram illustrates the arrangement of the various cables, suitable pulleys or other guiding members 46 are used at desired places for guiding the cables as they move around curves so that a desired direct pull may be had on the various brake planes to cause them to function. Referring more particularly to this figure it will be seen that the various reverse brake structures are connected by a single wire 57 so that they will all function at the same time. Likewise, the other brake mechanism is connected by a wire 58, whereby they will act in unison. The rudders 59, 60 and 61 are connected to act in unison while a single long elevator 62 acts as the elevator for the entire aircraft.

In operation, when the aircraft is in condition for use, the engines 8 and 9 are started and the joy stick or other control 63 is manipulated in the usual manner to shift the elevator 62 properly. As the aircraft gains momentum the elevator is shifted to cause the aircraft to leave the ground and is then actuated in the usual manner for attaining whatever elevation is desired, the engines being speeded up to the desired speed. After the aircraft is once in the air, the same is controlled in the usual manner by the joy stick 63 and by the rudder bar 64. As the joy stick 63 is moved for banking, the respective ailerons 10 and 11 will function in the usual manner, and, in addition, the various rudders 14, 15 and 16 will also function to assist the ailerons in making a sharper and more accurate turn. The movement of the ailerons naturally causes the banking action, while the movement of the rudders 14, 15 and 16 assist in this action, and by reason of the retarding functioning thereof, in addition present a steering structure adjacent the outer end of the wings in addition to the rudder or steering structure at the rear of the fuselage.

When traveling along at a desired speed and for some reason it becomes necessary to slow down the aircraft suddenly or slowly, the brake mechanism may be used without changing the speed of the engine, or the speed of the engine may be reduced and the brake mechanism also used. When using the brake mechanism, the lever 40 is merely pulled over and held over, whereupon the various brake planes 26 and 27 will be swung at their rearward ends to a point adjacent the respective fuselages, whereupon a retarding effect will be produced by reason of the air striking these surfaces. If at any time the aviator finds that the airplane is slipping or falling backwardly and downwardly, he may pull the lever 35 and hold it down, and the various reverse brake planes 36, 37 and 41 will be swung into an operative position, as above mentioned, to produce a retarding movement and thus give the aviator time to do whatever is necessary to secure a proper action of the aircraft. It will be understood that this particular structure is in the nature of a safety attachment but the brakes 26 and 27 may be used at any time to vary the speed either with or without adjusting the engines.

In connection with the various braking structures it will be seen that the braking planes 26 and 27 are associated with various stabilizing fins 65 and 66, there being two fins 65 and also two fins 66. This arrangement acts to stabilize the airship when in ordinary flight and coacts with the planes 26 and 27 to form pockets for the air when these planes are functioning. In addition, there is provided a pair of fins 67 coacting with the rear brake plane 41, while the rear brake planes 36 and 37 have pairs of stabilizing fins 68 and 69 coacting therewith to provide pockets facing to the rear when these planes are functioning. It will thus be seen that the various fins coact to produce stabilizing action when the brake planes are not in use and when the braking planes are in use the fins coact therewith to produce air pockets for making the plane and associated parts function in the desired manner.

I claim:—

1. An aircraft, including a fuselage, an aerofoil, propelling and controlling means, and brake structures, said brake structures including a swingable brake plane on each side of said fuselage, each plane being pivotally mounted at one end, a spring for each plane normally holding the respective planes substantially parallel to the axis of the fuselage, manually actuated means for swinging the planes out of said parallel position against the action of said springs, and a web rigidly mounted on said fuselage for each of said brake planes, said webs being positioned to divide the air diverted by the brake planes when the brake planes are functioning and with the brake planes and fuselage presenting pockets.

2. An aircraft of the airplane type including a fuselage, an aerofoil, propelling and controlling means and a plurality of brake structures, said brake structures being arranged on opposite sides of said fuselage and on top of the fuselage, each brake structure including a brake plane, means for pivoting the brake planes at one end, a spring acting to hold the brake planes substantially parallel to the axis of said fuselage, means for guiding said spring and a cable extending through the spring and connected with the brake planes for moving the brake planes against the action of the spring and out of parallelism with the axis of the fuselage.

3. An aircraft including a fuselage, a wing structure connected with the fuselage, means for propelling the aircraft, rudder and elevator means carried by the fuselage, and a plurality of brake structures carried by the fuselage, each of said brake structures including a web upstanding from the fuselage and extending fore and aft thereof, a brake plane having one end hingedly connected to the fuselage at one end of the web, said plane being normally positioned against the outer edge of said web, a control system for swinging the said brake plane into and out of functioning position, automatically acting means for swinging said plane out of functioning position, said control system having a control lever and a plurality of control cables connected to said lever and the brake plane.

4. An aircraft having a fuselage and a brake structure carried by the fuselage, said brake structure including a web upstanding from the fuselage near the rear thereof, said web extending fore and aft, said web having the outer edge inclined at a sharp angle from the angle of the fuselage whereby the narrow end of the web is at the front and the wide end is at the rear, a bracket carried by the fuselage at the wide end of said web, a brake plane pivotally connected to said bracket, means for guiding the front end of the brake plane as it swings towards and from said web, a spring for normally holding the brake plane substantially parallel with the axis of the fuselage, and manually actuated control means for swinging the brake plane against the action of said spring towards said web.

THEODORE M. LEKA.